United States Patent [19]
Gradeff et al.

[11] 3,869,517
[45] Mar. 4, 1975

[54] PROCESS FOR PREPARING HYDROXY CITRONELLAL BY SAPONIFICATION OF THE HYDROXY ESTER

[75] Inventors: Peter S. Gradeff, Andover; Claude Bertrand, Somerset, both of N.J.

[73] Assignee: Rhodia, Inc., New York, N.Y.

[22] Filed: Apr. 28, 1971

[21] Appl. No.: 138,359

[52] U.S. Cl.............. 260/602, 260/484 R, 260/494, 252/522
[51] Int. Cl............................................ C07c 47/18
[58] Field of Search............... 260/494, 602, 617 R

[56] References Cited
UNITED STATES PATENTS

| | | | |
|---|---|---|---|
| 1,790,523 | 1/1931 | Davis et al. | 260/639 |
| 2,306,332 | 12/1942 | Flisik et al. | 260/602 |
| 2,812,355 | 11/1957 | Fox | 260/602 |
| 2,874,183 | 2/1959 | Isler et al. | 260/494 |

OTHER PUBLICATIONS

Verly, "Bull. Chim. Soc. France," Vol. 43, part 2, pg. 850 (1928) QD1.S4.

*Primary Examiner*—Leon Zitver
*Assistant Examiner*—Norman P. Morgenstern

[57] ABSTRACT

A process is provided for the preparation of hydroxy citronellal starting from citronellal, by way of the citronellyl enol ester or citronellyl diester. The citronellyl enol ester or diester is prepared by acylation of citronellal, using an organic acid anhydride. The hydration of the enol ester or citronellyl diester is carried out using aqueous 58 to 78% sulfuric acid, and the hydroxy enol ester and hydroxy diester are saponified by a strong base in the presence of water.

18 Claims, No Drawings

PROCESS FOR PREPARING HYDROXY CITRONELLAL BY SAPONIFICATION OF THE HYDROXY ESTER

Hydroxy citronellal is a valuable perfume or fragrance, widely used in soap and cosmetic perfumery. Paul Z. Bedonkian, *Perfumery and Flavoring Synthetics*, Second Edition, 1967, page 182, refers to it as "an indispensable ingredient in most perfume compositions".

Hydroxy citronellal is usually prepared by hydration of the bisulfite compound of citronellal, using aqueous from 40 to 60% sulfuric acid solution at from $-5°$ to $0°C$ for from 5 to 12 hours. The hydroxylated bisulfite compound of citronellal is then decomposed to form hydroxy citronellal, while the byproducts of the reaction are separted by extraction with solvent. This method has however many drawbacks, which make it unsuitable for large scale manufacture.

U.S. Pat. No. 3,060,237, dated Oct. 23, 1962, and British Pat. No. 923,901, dated Apr. 18, 1963, and U.S. Pat. No. 2,902,495, dated Sept. 1, 1959, suggest the preparation of hydroxy citronellal starting with pinene. U.S. Pat. No. 3,028,431, dated Apr. 3, 1962, suggests 7, 8-epoxy-2, 6-dimethyl-2-octanol as a starting material. However, citronella is still the most attractive raw material, since it is available in quantity as a main component of citronella oil, as well as other volatile oils, such as lemon oil, lemon grass oil, and melissa oil. It can also be made in quantitative yield from citral by hydrogenation.

Verley, *Bull. soc. chim. France* 43 850 (1928), suggests the hydration of the enol acetate of citronellal, and the decomposition of the resulting hydroxy citronellyl enol acetate, using weak alkali. No experimental details or examples of weak alkali are given, and neither are reaction conditions. The weak alkalis are generally considered to be ammonium hydroxide and weakly alkaline salts, such as ammonium salts. We have found that weak alkalis give either no reaction or quite low yields, which are not satisfactory for an economical commercial process.

In accordance with the invention, a process is provided for the preparation of hydroxy citronellal (3, 7-dimethyl-7-hydroxyoctanal), starting with citronellal and proceeding by way of the enol ester or diester of citronellal, which is hydrated and then saponified to form hydroxy citronellal.

The hydration reaction features the use of aqueous 58 to 78% sulfuric acid at a temperature within the range from about $-20°$ to about $+50°C$.

The saponification features the use of a strong base in the presence of water, resulting in the formation of hydroxy citronellal and the corresponding alkaline salt. The reaction proceeds at temperatures ranging from room temperature up to reflux temperature, and in the latter case the hydroxy citronellal is obtained in very good yield.

The term "strong base" as used herein is inclusive of any strong base such as an alkali metal or alkaline earth metal hydroxide or oxide, as well as the alkali metal and alkaline earth metal salts, such as the carbonates and bicarbonates, which yield strong bases by hydrolysis in aqueous solutions.

The three reactions that are combined in the process of the invention to form an overall synthesis of hydroxy citronellal are as follows:

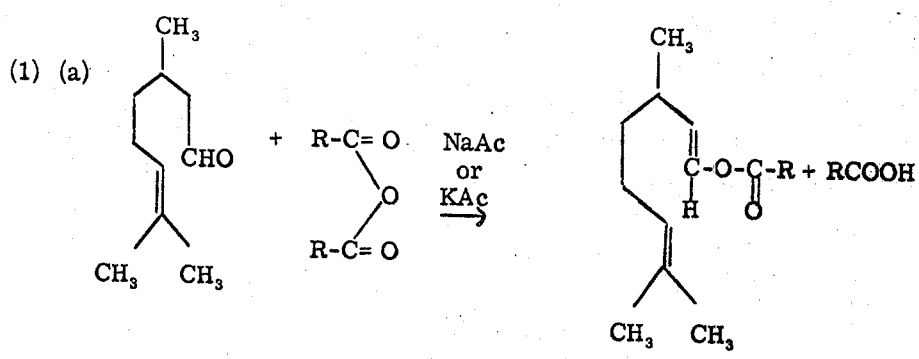

Citronellyl enol ester

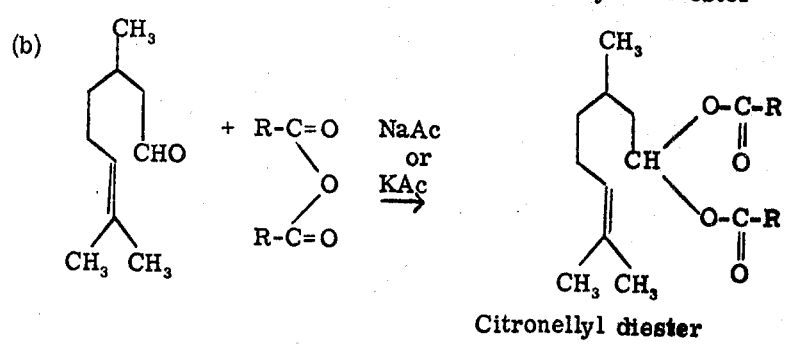

Citronellyl diester (2) (a) 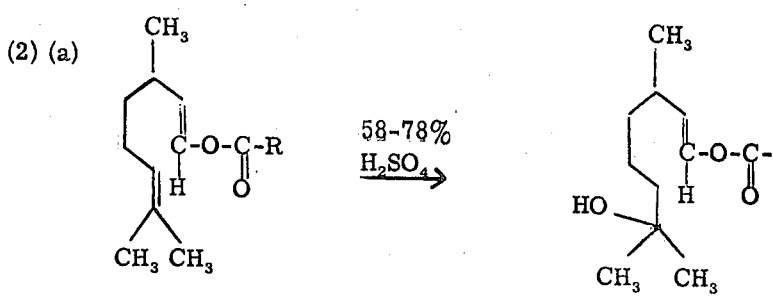

Hydroxy citronellyl enol ester (b) 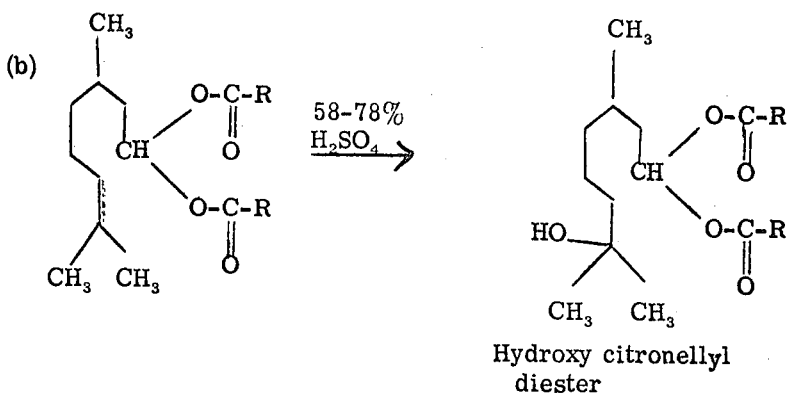

Hydroxy citronellyl diester (3) (a) 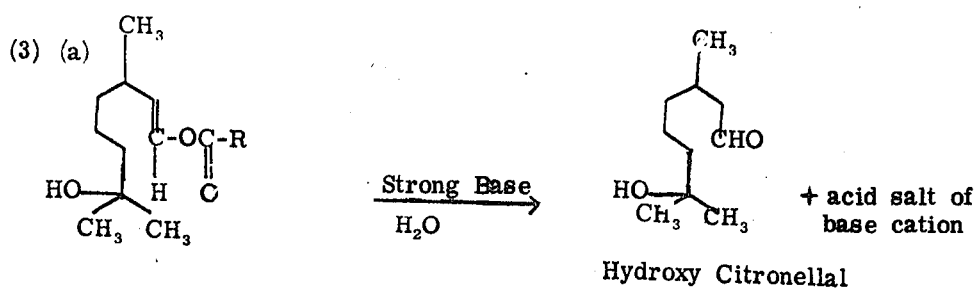

Hydroxy Citronellal (b) 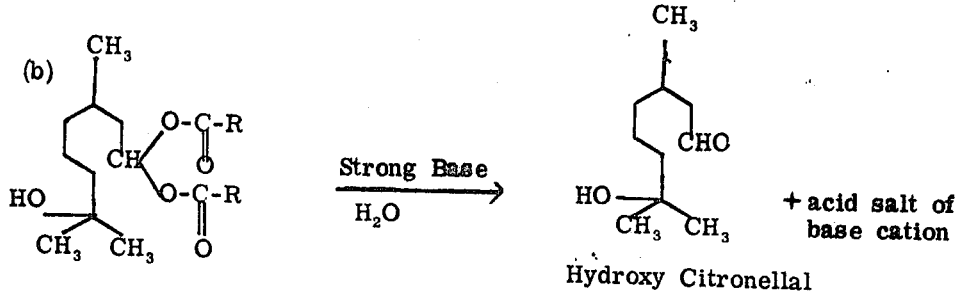

Hydroxy Citronellal

In the above formulae, R represents a lower aliphatic radical of a lower aliphatic acid anhydride, such as acetic anhydride (which is preferred) or of a lower aliphatic acid, such as acetic acid (which is preferred), and the cation of the strong base is an alkali or alkaline earth metal.

The first reaction, preparation of the citronellyl enol ester or diester, is a known reaction. The lower aliphatic acid anhydride and citronellal are heated under reflux in the presence of an alkali metal salt of a lower aliphatic carboxylic acid, such as sodium or potassium acetate, propionate, butyrate or valerate. Any lower aliphatic acid anhydride having up to five carbon atoms can be employed, such as acetic anhydride, propionic anhydride, butyric anhydride, isobutyric anhydride, and valeric anhydride. An excess of the acid anhydride is employed, ranging from 1½ to 7 times the stoichiometric amount. The reaction product can be citronellyl enol ester, diester, or a mixture of both, in any proportion, according to the amount of acid anhydride present. Although the diester leads to the same final product as the enol ester, it is more economical to work with the enol ester. Therefore, it is preferred to proceed via the enol ester.

The amount of alkali metal organic acid salt, such as potassium acetate or sodium acetate, required is usually in the order of from about 10 to about 30% by weight, based on citronellal.

The reaction proceeds with formation of equimolar amounts of the free acid of the acid anhydride used when the monoester is formed, and this is separated by distillation, preferably continuously, as it is formed, since the presence of free acid seems to favor increased formation of diester and also provoke cyclization of citronellal and/or the enol ester into isopulegol ester, which is not a desirable product and consequently lowers the yield. For this reason, a reaction carried out under reflux of the reaction system is convenient, since the acid can be removed from the distillate (which is then returned) in the course of the reaction. At the conclusion of the reaction, the reaction mixture is fractionated, and the citronellyl enol ester and/or diester is obtained.

The purpose of the esterification is to protect the aldehyde group of the citronellal during the hydration reaction, which is carried out using aqueous sulfuric acid having a concentration within the range from about 58 to about 78% sulfuric acid, preferably from 60 to 70% sulfuric acid. The sulfuric acid concentration is critical. A more dilute solution is relatively ineffective, and a more concentrated solution tends to produce undesirable by-products, which may include polymers or cyclized products.

The hydration reaction can be carried out at a temperature within the range having about −20° to about +50°C. The reaction is usually complete in from about 2 hours at the lower temperature to a few minutes at the higher temperatures.

The reaction can be carried out batchwise or continuously. Due to the high heat of reaction, a continuous process is preferable in a large scale operation. In the continuous process, the enol ester and the sulfuric acid are blended and run continously into the reactor at a relatively low temperature, such as room temperature. The flow rate through the reactor is established to provide a residence time in the reactor corresponding to the desired reaction time, usually a few minutes, depending on the preferred reaction temperature, reactor characteristics, reactants, and acid concentration.

In batch reactions, it is usually preferable, although not essential, to add the enol ester or diester to the sulfuric acid solution at the desired reaction temperature, since the sulfuric acid solution is in the greater volume. The enol ester or diester can be added rather rapidly, over a period of about 15 minutes, after which the reaction temperature is maintained until hydration is complete. The reaction mixture is then worked up and the reaction product distilled.

The saponification of the hydroxy enol ester or diester to hydroxy citronellal is carried out by means of a strong base selected from the group consisting of the hydroxides and alkaline salts of the alkali metals and alkaline earth metals, i.e. an alkali metal or alkaline earth metal salt. Exemplary strong bases are the alkali metal hydroxides, such as sodium hydroxide, potassium hydroxide, or lithium hydroxide, the alkaline earth metal oxides and hydroxides, such as calcium oxide and hydroxide, barium oxide and hydroxide, and strontium oxide and hydroxide. Exemplary alkaline salts thereof are the alkali metal carbonates, such as sodium and potassium carbonates, calcium, strontium and barium carbonates, and sodium and potassium bicarbonate. The amount of strong base required is stoichiometric with respect to the ester function in the enol ester or diester or mixtures of both, and thus for optimum yields a stoichiometric amount is used, but lesser or greater than stoichiometric amounts can be used. If less, yield is reduced correspondingly. If more, the base is wasted, and uneconomic, and may attack the product, thus lowering the yield.

In the case of the alkali metal and alkaline earth metal salts, the amount required is two equivalents per mole of enol ester or diester, not one equivalent. Thus, in the case of the carbonates and bicarbonates of the alkali metals, one mole and two moles, respectively, per mole of enol ester or diester is needed, not 0.5 mole or 1 mole. This is quite surprising. However, the yields obtained when this amount is used are comparable to those when one mole (one equivalent) of strong base is used.

One would expect difficulties in obtaining a good yield of hydroxycitronellal by saponification of the enol ester or diester with a strong base, due to the instability of this aldehyde in alkaline medium. Given the sensitivity of hydroxycitronellal upon contact with strong alkali, Verley's choice of weak alkali is quite in order. It is surprising, therefore, that superior results can be obtained in accordance with the invention by the use of a strong base and, even more surprising, at high temperatures. A further problem is the immiscibility between the aqueous caustic solution and the enol ester or/and diester, and therefore the rate of reaction depends to some extent on how well the mixture is stirred. It has been found that high yields (92–95%) of hydroxycitronellal from enol acetate and diacetate can be obtained by adding gradually an aqueous solution of a strong base into a well stirred, refluxing mixture of the enol ester and/or diester and water.

The reaction proceeds at low temperatures, and has a slow rate at room temperature, at which temperature good yields can be obtained. The reaction proceeds more rapidly at elevated temperatures, up to about 100°C. A convenient elevated temperature is the reflux temperature of the reaction mixture.

The reaction is usually complete in from one to a few hours.

The following Examples in the opinion of the inventors represent preferred embodiments of the invention.

EXAMPLES 1 to 26

A series of hydrations of citronellal enol acetate, diacetate, and mixtures thereof was carried out, according to the following procedure:

In Examples 1 to 26, the citronellyl enol acetate, citronellyl diacetate, or mixtures thereof with up to 10% diacetate were added over a period of about 15 minutes to the aqueous sulfuric acid held at the reaction temperature indicated in the Tables I, II, III and IV below. The reaction mixture was then held at this temperature for the reaction time shown in these Tables, after which the reaction mixture was worked up, and the reaction product distilled.

Table I records examples of hydration of citronellyl enol acetate. In Example 8, the sulfuric acid solution was added to the enol acetate. The data show that yields of up to 92% of theory are obtainable. In all cases, about 2 to about 5% isopulegyl acetate was formed and a small amount of residue.

Tables II are III record examples of hydration of citronellyl diacetate and of mixtures of enol acetate and diacetate. The data show that both the diacetate and mixtures of diacetate and monoacetate react in good yield. Consequently, it is not necessary to separate these two compounds at the end of the esterification reaction.

Table IV records Examples 21 to 26, showing hydration of undistilled mixtures of enol acetate and diacetate as they are obtained from the acylation reaction after removal of excess acetic anhydride, using 56 to 74% sulfuric acid. The data show that from 60 to 70% sulfuric acid gives optimum yields, but good yields are also obtained at 74 up to 78% sulfuric acid and at less than 60% down to 58% sulfuric acid.

TABLE I

HYDRATION OF CITRONELLYL ENOL ACETATE

| Example No. | Amount of enol acetate (g.) | H$_2$SO$_4$ Concentration % | H$_2$SO$_4$ Weight Ratio to Enol Acetate | Temperature °C. | Time (hours) | Product Weight[1] (flashed) (g.) | Unreacted enol acetate (%) | Hydroxy enol acetate (%) | Residue (g.) | % Yield |
|---|---|---|---|---|---|---|---|---|---|---|
| 1 | 50 | 64 | 6 to 1 | −20 | 2 | 50 | 0 | 91 | 1.5 | 86 |
| 2 | 50 | 64 | 3 to 1 | −20 | 2 | 50.5 | 0 | 92 | 1.5 | 87.5 |
| 3 | 100 | 64 | 1.5 to 1 | −20 | 2 | 100.5 | 18 | 75 | 3 | 88 |
| 4 | 100 | 64 | 3 to 1 | −20 | 2 | 102 | | 97 | 3 | 91 |
| 5 | 200 | 64 | 3 to 1 | −20 | 2 | 206 | 2 | 93 | 5 | 90 |
| 6 | 300 | 64 | 3 to 1 | −20 | 2 | 307 | 9.5 | 85.5 | 7.5 | 89 |
| 7 | 100[2] | 64 | 3 to 1 | −20 | 2 | 99.5 | 0 | 95 | 4.5 | 89 |
| 8 | 100[3] | 64 | 3 to 1 | −20 | 2 | 101.5 | 0 | 96 | 3.5 | 91 |
| 9 | 100 | 64 | 3 to 1 | −20 | 1 | 103 | 5.5 | 91 | 2 | 92 |
| 10 | 100 | 64 | 3 to 1 | −10 | ½ | 102.5 | 3 | 95 | 3 | 91 |
| 11 | 100 | 64 | 3 to 1 | 0 | ⅓ | 97 | 15 | 76 | 4 | 80 |
| 12 | 75 | 64 | 2 to 1 | −10 | 1 | 76.5 | 2.5 | 92.5 | 2.5 | 90 |
| 13 | 100 | 64 | 1.5 to 1 | −10 | 1 | 101 | 7.5 | 89 | 3.5 | 90 |
| 14 | 100 | 64 | 1.5 to 1 | 0 | ½ | 99.5 | 2% | 90 | 5 | 85 |

[1] 2 to 5% isopulegyl acetate is formed during hydration in all cases.
[2] Drowning into ice water. All other examples, quenching into soda ash solution.
[3] H$_2$SO$_4$ added to enol acetate.

TABLE II

HYDRATION OF CITRONELLYL DIACETATE

| Example No. | Amount of diacetate (g.) | H$_2$SO$_4$ Concentration (%) | H$_2$SO$_4$ Weight Ratio to Diacetate | (°C.) | Time (Hours) | Weight flashed (g.) | Unreacted diacetate (%) | Hydroxy diacetate (%) | Residue | % Yield |
|---|---|---|---|---|---|---|---|---|---|---|
| 15 | 100 | 64 | 3 to 1 | −20° | 2 | 94.5 | 5 | 88 | 3.5 | 81 |
| 16 | 75 | 64 | 2 to 1 | −10° | 1 | 69 | 47 | 47.5 | 2 | 72 |

TABLE III

HYDRATION OF MIXTURES OF ENOL ACETATE AND DIACETATE

| Ex. No. | Composition of mixture Enol Acetate (%) | Composition of mixture Di Acetate (%) | Amount of mixture (%) | H$_2$SO$_4$ Conc. (%) | H$_2$SO$_4$ Wt. Ratio to Diacetate Enol Acetate Mixture | Temp. (°C.) | Time (Hrs.) | Wt. flashed (g.) | Unreacted Products (%) | Hydroxy compounds (%) | Residue (%) | % Yield |
|---|---|---|---|---|---|---|---|---|---|---|---|---|
| 17 | 90 | 9 | 100 | 64 | 3 to 1 | −20° | 2 | 100 | enol 3 / di 2.5 | 84 / 6 | 2.5 | 90 |
| 18 | 90 | 9 | 50 | 64 | 3 to 1 | −20° | 2 | 50 | enol / di } 0 | 89 / 7.5 | 2 | 90 |
| 19 | 90 | 10 | 100 | 64 | 3 to 1 | −20° | 1 | 102.5 | enol 7.5 / di 1 | 81.5 / 7 | 2 | 90 |
| 20 | 90 | 10 | 100 | 64 | 3 to 1 | −20° | 2 | 99 | enol 11.5 / di 4.2 | 76 / 0 | 3 | 80 |

TABLE IV

HYDRATION[1] OF UNDISTILLED MIXTURES[2] OF ENOL AND DIACETATE

| Ex. No. | Concentration of Sulfuric Acid % | Time of Reaction hr | Product Distillate g | Weight Residue g | Product Analysis (GLC) % Unreacted Mono | Di | % Hydroxy Mono | Di | Direct | % Yield Based on used acetates |
|---|---|---|---|---|---|---|---|---|---|---|
| 21 | 74 | 2 | 41 | 4 | 8 | 10 | 56.5 | 55 | 60 | 66 |
| 22 | 69 | 2 | 45.5 | 3 | 6.5 | 9 | 70.5 | 8.5 | 78 | 88 |
| 23 | 66 | 3 | 45 | 3 | 5.5 | 1 | 77 | 15.5 | 88 | 92 |
| 24 | 63 | 2 | 47 | 3.5 | 4 | 5 | 72 | 12.5 | 85 | 94 |
| 25 | 61 | 5 | 43 | 3.5 | 4.5 | 6 | 68 | 13 | 76 | 84 |
| 26 | 56 | 4 | 46 | 1.5 | 45 | 14 | 6.5 | 5 | Mostly unreacted enol acetate besides 27% Isopulegylacetate | |

[1] All experiments conducted at −20 − 25°C., using 50g of mixture and 300g of acid.
[2] Analysis of the undistilled mixtures: 71% mono acetate, 16.5% diacetate, 3% polymeric material, 10% low boiling material, including isopulegyl acetate.

EXAMPLE 27

Hydration of citronellyl enol acetate in a continuous manner

The reactor was a circular tube in a closed loop about 8 feet long and 200 cc. in volume, with injection ports for the sulfuric acid and the enol acetate, mixing chamber with a gear pump and overflow port for removal of the reaction mixture. The reactor was internally and externally cooled by a circulating cooling mixture. The pump was operated at 400 r.p.m. and the speed of recirculation of the mixture in the reactor was 65 cm/sec. The residence time averaged from 6 seconds to about 6 minutes; the reaction temperature was 18°C; the concentration of sulfuric acid 69%, weight ratio sulfuric acid to enol acetate 1.35 to 1.0. The unreacted enol acetate was 20%, which could be recycled. The yield based on reacted enol acetate was 75%, 60% based on enol acetate charged to the reactor.

EXAMPLES 28 to 33

Following the procedure of Examples 1 to 20, a quantity of mixed hydroxy citronellal enol acetates and diacetates was prepared. This was separated into portions, which were hydrolyzed in the presence of strong alkali under the conditions shown in Table V.

The above data show the effectiveness of sodium hydroxide, even under reflux, as well as at room temperature (Examples 28 to 31). Example 32 and Controls G and H show that one mole (two equivalents) of $K_2CO_3$ per mole of enol ester is required for a good yield. Example 33 shows that two moles (two equivalents) of a bicarbonate $KHCO_3$ are needed under the same conditions.

TABLE V

| Ex. No. | HEA charged % purity | g. (mole) | Base[2] | Weight (mole) | Mole ratio[3] | Temp. (°C.) | Time (hrs) for base add'n. | after base add'n. | Distillation Distillate (g) | Residue (g) | (oxi-mation %) | Distillate Analysis H.C. HEA (% by GLC) | Higher Boilers (%) | % Yield HC over HEA |
|---|---|---|---|---|---|---|---|---|---|---|---|---|---|---|
| 28 | 92.5[1] | 25g (0.108) | NaOH | 4g (0.1) | 0.9 | Reflux | 1 | ¼ | 20 | 0.5 | 87.5 | 3.5 | 6 | 92(95) |
| 29 | 92.5[1] | 25g (0.108) | NaOH | 4.5g (0.112) | 1.0 | Reflux | 1 | ¼ | 18.5 | 1.5 | 93 | None | 2 | 92 |
| 30 | 98 | 25g (0.115) | NaOH | 4.6–4.7g (0.117) | 1.02 | Reflux | 1½ | 1/12 | 18 | 2 | 94 | None | 6 | 87 |
| 31 | 98 | 25g (0.115) | NaOH | 4.6–4.7g (0.117) | 1.02 | 25° | 3 | 1 | 15.5 | 4.5 | 87.5 | 3.5 | 6 | 69 |
| 32 | 98 | 25g (0.115) | $K_2CO_3$ | 17g (0.115) | 1.0 | Reflux | 3 | 1 | 19.5 | 1 | 94 | 1 | 5 | 93 |
| Control G. | 98 | 25g (0.115) | $K_2CO_3$ | 8g (0.057) | 0.5 | 70–75 90–100 | 2 | 1¾ | 20 | 2 | 48 | 50 | 2 | only half reacted |
| Control H | 98 | 25g (0.115) | $K_2CO_3$ | 8g (0.057) | 0.5 | 25° | 6 | 2 | 23.5 | 1.5 | 8 | 85 | 7 | no significant reaction |
| 33 | 92.5[1] | 25g (0.108) | $KHCO_3$ | 22.5g (0.225) | 2.0[4] | Reflux | at once | 5 | 17.5–18 | 2–2.5 | 92.5 | None | 6 | 87–90% |

[1] 5% citronellyl acetate
[2] Total water in all experiments 100g, that is, 50g with HEA, 50g to dissolve base.
[3] Mole ratio over acetate function
[4] 100% excess required for good yield Having regard to the foregoing disclosure, the following is claimed as the inventive and patentable embodiments thereof:

1. In the process for the preparation of hydroxy citronellal from citronellal, the improvement which comprises preparing an enol ester or diester or mixture thereof of citronellal by reaction with a lower alkanoic acid anhydride in the presence of an alkali metal lower alkanoic acid salt, hydrating the resulting enol ester or diester or mixture thereof in the presence of aqueous sulfuric acid having a sulfuric acid concentration within the range from about 58 to about 78% at a temperature within the range from about −20° to about 50°C., and then saponifying the hydroxy enol ester or diester to form hydroxy citronella with an aqueous solution of a strong base selected from the group consisting of the hydroxides, oxides and salts, which yield strong bases by hydrolysis in water, of the alkali metals and alkaline earth metals.

2. A process in accordance with claim 1, in which the amount of sulfuric acid solution in the hydration reaction is within the range from about 1 to about 6 parts per part of enol ester.

3. A process in accordance with claim 1, in which the hydration reaction time is within the range from a few minutes to about 2 hours.

4. A process in accordance with claim 1, in which the ester and aqueous sulfuric acid are blended continuously, and continuously passed through a reaction zone to effect the hydration.

5. A process in accordance with claim 1, in which the base is an alkali metal hydroxide.

6. A process in accordance with claim 5, in which the alkali metal hydroxide is potassium hydroxide.

7. A process in accordance with claim 5, in which the alkali metal hydroxide is sodium hydroxide.

8. A process in accordance with claim 1, in which the base is an alkali metal carbonate.

9. A process in accordance with claim 8, in which the base is an alkali metal bicarbonate.

10. A process in accordance with claim 9, in which the alkali metal bicarbonate is used in an amount exceeding the stoichiometric amount.

11. A process in accordance with claim 1, in which the saponification reaction is carried out at a temperature within the range from ambient temperature to the reflux temperature of the reaction mixture.

12. A process in accordance with claim 1, in which the base in the saponification is in an approximately stoichiometric amount.

13. A process in accordance with claim 1, in which the lower alkanoic acid anhydride is acetic anhydride.

14. A process for the preparation of hydroxy citronellal from a citronellyl-lower alkanoic acid anhydride enol ester, diester or mixture thereof, which comprises reacting the enol ester, diester or mixture thereof at a temperature within the range from about −20° to about 50°C., in the presence of aqueous sulfuric acid having a sulfuric acid concentration within the range from about 58 to about 78% until a hydroxy ester is formed, and then reacting the hydroxy ester with an aqueous solution of a strong base selected from the group consisting of the hydroxides, oxides and salts which yield strong bases by hydrolysis in the presence of water, of the alkali metals and alkaline earth metals until hydroxy citronellal is formed.

15. A process in accordance with claim 14 in which the amount of sulfuric acid solution is with the range from about 1 to about 6 parts per part of enol ester.

16. A process in accordance with claim 14, in which the reaction is carried out at a temperature within the range from ambient temperature to the reflux temperature of the reaction mixture.

17. A process in accordance with claim 14, in which the base is an alkali metal or alkaline earth metal hydroxide.

18. A process in accordance with claim 14, in which the ester and aqueous sulfuric acid are blended continuously, and are continuously passed through a reaction zone to effect the hydration.

* * * * *

UNITED STATES PATENT OFFICE
CERTIFICATE OF CORRECTION

Patent No. 3,869,517                    Dated March 4, 1975

Inventor(s) Claude Bertrand et al                    Page 1 of 3

It is certified that error appears in the above-identified patent and that said Letters Patent are hereby corrected as shown below:

Page 1, Column 2, under Other Publications: "Verly" should be --Verley--

Column 6, line 68          :     "are" should be --and--

Columns 7 and 8 Table II, Heading to Fifth Column

TABLE II
HYDRATION OF CITRONELLYL DIACETATE

| Example No. | Amount of diacetate (g.) | $H_2SO_4$ Concentration (%) | $H_2SO_4$ Weight Ratio to Diacetate | (°C.) | Time (Hours) | Weight flashed (g.) | Unreacted diacetate (%) | Hydroxy diacetate (%) | Residue | % Yield |
|---|---|---|---|---|---|---|---|---|---|---|
| 15 | 100 | 64 | 3 to 1 | −20° | 2 | 94.5 | 5 | 88 | 3.5 | 81 |
| 16 | 75 | 64 | 2 to 1 | −10° | 1 | 69 | 47 | 47.5 | 2 | 72 | should be

TABLE II
HYDRATION OF CITRONELLYL DIACETATE

| Example No. | Amount of diacetate (g.) | $H_2SO_4$ Concentration (%) | $H_2SO_4$ Weight Ratio to Diacetate | Temp (°C.) | Time (Hours) | Weight flashed (g.) | Unreacted diacetate (%) | Hydroxy diacetate (%) | Residue | % Yield |
|---|---|---|---|---|---|---|---|---|---|---|
| 15 | 100 | 64 | 3 to 1 | −20° | 2 | 94.5 | 5 | 88 | 3.5 | 81 |
| 16 | 75 | 64 | 2 to 1 | −10° | 1 | 69 | 47 | 47.5 | 2 | 72 |

UNITED STATES PATENT OFFICE
CERTIFICATE OF CORRECTION

Patent No. 3,869,517                    Dated March 4, 1975

Inventor(s) Claude Bertrand et al

It is certified that error appears in the above-identified patent and that said Letters Patent are hereby corrected as shown below:

Columns 7 and 8 Table III under last heading, Examples 19 and 20 :

TABLE III

HYDRATION OF MIXTURES OF ENOL ACETATE AND DIACETATE

| Ex. No. | Composition of mixture Enol Acetate (%) | Di Acetate (%) | Amount of mixture | $H_2SO_4$ Conc. (%) | Wt. Ratio to Diacetate Enol Acetate Mixture | Temp. (°C.) | Time (Hrs.) | Wt. flashed (g.) | PRODUCT: Weight and Analysis Unreacted Products (%) | Hydroxy compounds (%) | Residue (%) | % Yield |
|---|---|---|---|---|---|---|---|---|---|---|---|---|
| 17 | 91 | 9 | 100 | 64 | 3 to 1 | −20° | 2 | 100 | enol 3<br>di 2.5 | 84<br>6 | 2.5 | 90 |
| 18 | 91 | 9 | 50 | 64 | 3 to 1 | −20° | 2 | 50 | enol } 0<br>di | 89<br>7.5 | 2 | 90 |
| 19 | 90 | 10 | 100 | 64 | 3 to 1 | −20° | 1 | 102.5 | enol 7.5<br>di 1 | 81.5<br>7 | 2 | 90 |
| 20 | 90 | 10 | 100 | 64 | 3 to 1 | −20° | 2 | 99 | enol 11.5<br>di 4.2 | 76<br>0 | 3 | 80 |

UNITED STATES PATENT OFFICE
CERTIFICATE OF CORRECTION

Patent No. 3,869,517  Dated March 4, 1975

Inventor(s) Claude Bertrand et al  Page - 3 of 3

It is certified that error appears in the above-identified patent and that said Letters Patent are hereby corrected as shown below:

should be

TABLE III

HYDRATION OF MIXTURES OF ENOL ACETATE AND DIACETATE

| | Composition of mixture | | Amount of mixture | $H_2SO_4$ | Wt. Ratio to Diacetate Enol Acetate Mixture | Temp. (°C.) | Time (Hrs.) | PRODUCT: Weight and Analysis | | | | |
|---|---|---|---|---|---|---|---|---|---|---|---|---|
| Ex. No. | Enol Acetate (%) | Di Acetate (%) | | Conc. (%) | | | | Wt. flashed (g.) | Unreacted Products (%) | | Hydroxy compounds (%) | Residue (%) | % Yield |
| 17 | 90 | 9 | 100 | 64 | 3 to 1 | −20° | 2 | 100 | enol di | 3 2.5 | 84 6 | 2.5 | 90 |
| 18 | 90 | 9 | 50 | 64 | 3 to 1 | −20° | 2 | 50 | enol di | 0 | 89 7.5 | 2 | 90 |
| 19 | 90 | 10 | 100 | 64 | 3 to 1 | −20° | 1 | 102.5 | enol di | 7.5 1 | 81.5 7 | 2 | 94 |
| 20 | 90 | 10 | 100 | 64 | 3 to 1 | −20° | 2 | 99 | enol di | 11.5 4.2 | 76 0 | 3 | 85 |

Column 11, line 15 : "citronella" should be --citronellal--

Signed and Sealed this tenth Day of February 1976

[SEAL]

Attest:

RUTH C. MASON
Attesting Officer

C. MARSHALL DANN
Commissioner of Patents and Trademarks